United States Patent [19]

Rogers

[11] Patent Number: 4,748,295

[45] Date of Patent: May 31, 1988

[54] FOUR BUTTON CURSOR AND METHOD FOR DIGITIZING TABLET

[75] Inventor: James L. Rogers, Mesa, Ariz.

[73] Assignee: Kurta Corporation, Phoenix, Ariz.

[21] Appl. No.: 6,664

[22] Filed: Jan. 23, 1987

Related U.S. Application Data

[63] Continuation-in-part of Ser. No. 719,351, Apr. 3, 1985, Pat. No. 4,672,154.

[51] Int. Cl.⁴ ............................................. G08C 21/00
[52] U.S. Cl. ........................................ 178/19; 363/60; 307/264
[58] Field of Search ...................... 178/18, 19; 363/59, 363/60; 307/264; 340/710

[56] References Cited

U.S. PATENT DOCUMENTS

| | | | |
|---|---|---|---|
| 4,194,084 | 3/1980 | Hetzel | 178/19 |
| 4,600,807 | 7/1986 | Kable | 340/710 X |
| 4,639,547 | 1/1987 | Jacob-Grinschgl et al. | 178/18 |

*Primary Examiner*—Stafford D. Schreyer

*Attorney, Agent, or Firm*—Cahill, Sutton & Thomas

[57] ABSTRACT

A cordless four button cursor unit for accurately digitizing points along a digitizing tablet surface has an insulative housing including four buttons, each shaped as a quadrant of a circle and arranged about a hub. The hub acts as a stationary support from which an operator's fingers can conveniently "roll" to actuate any of the buttons. An antenna loop integral with a printed circuit board extends forward of the housing and subtends a cross hair on the bottom surface of a transparent substrate. A pair of conductive touch plates on opposite sides of the housing are short circuited by the resistance of an operator's hand, enabling an oscillator to effectuate operation of the cursor unit, causing the antenna to transmit electrostatic signals of frequencies representing button commands. The capacitance of the operator's body adds to the ground plane capacitance, so that transmission of electrostatic signals by the ground plane to the digitizing tablet is avoided. When the opeator's hand breaks contact with the touch plates, the oscillator is disabled before data errors can be produced by the resulting decrease in gound plane capacitance.

25 Claims, 3 Drawing Sheets

FOUR BUTTON CURSOR AND METHOD FOR DIGITIZING TABLET

CROSS-REFERENCE TO RELATED APPLICATION

This application is a continuation-in-part of our allowed copending patent application entitled "Low Power, High Resolution Digitizing System with Cordless Pen/Mouse", Ser. No. 719,351, filed Apr. 3, 1985 by James L. Rodgers and Charles A. Waterbury, issued as U.S. Pat. No. 4,672,154 on June 9, 1987, incorporated herein by reference, and hereinafter referred to as the "parent application".

BACKGROUND OF THE INVENTION

The invention relates to cursors, digitizing pens, mouse input devices utilized for inputting or and mouse input devides utilized for inputting or digitizing data or for inputting mouse commands to a computer, and more particularly to a four button cursor and method of operation.

The above-referenced parent application describes a cordless pen that may be utilized to digitize points lying along the surface of a digitizing tablet and also to input mouse commands via the tablet into a computer. The tubular structure of the cordless pen allows a cylindrical conductor to function as a relatively high capacitance virtual ground plane which cannot transmit error-causing electrostatic signals to the digitizing tablet. A relatively low capacitance conductive stylus tip protrudes from an open end of the cylindrical virtual ground plane and produces high intensity electrostatic signals that are scanned and precisely located by the digitizing tablet. The parent application explains at length why the ground plane capacitance must be large relative to the stylus capacitance. While the device has been very successful commercially, there are applications in which it would be desirable to have a "cursor" unit for digitizing points on a document resting on a digitizer surface, wherein the cursor rests on and is slid on the surface to be digitized, and has a cross hair that an operator can easily visually align with points to be digitized, and can conveniently actuate various control buttons to transmit various cursor commands to a computer via the digitizing tablet. Such a cursor unit would not be as subject to tilting as a typical digitizing pen, and could be more rapidly and precisely aligned with points to be digitized. Such a cursor unit thus would be very useful where a large number of points of a document need to be digitized. It also would be beneficial if such a cursor unit could be cordless, just as the cordless pen described in the above-referenced parent application has proven to be very convenient. However, the tubular conductor that functioned as effectively as a virtual ground plane in the above-described cordless pen is not readily adaptable to a cordless cursor of the above-described type. Therefore, it would be very convenient if the capacitance of the body of the person operating the cursor could be utilized as a ground plane capacitance. However, this technique presents a serious problem in the design of such a cursor unit, because the cursor typically will be left resting on the digitizing surface when an operator momentarily removes his or her hand from it. For example, when a operator initially grasps the cursor unit, there will be a large increase in the ground plane capacitance. Similarly, when the cursor operator releases the cursor unit, there will be a large decrease in the ground plane capacitance. When the net ground plane capacitance undergoes the decrease, the relatively small capacitance internal ground plane of the cursor will begin acting as an antenna, transmitting signals that are scanned by the digitizing tablet along with the signals being radiated by the antenna, producing errors in the digitized data.

A voltage doubling circuit is described in the above-referenced parent application for boosting the voltage generated by the batteries in the cordless pen. Although that circuit operates well, it would be desirable to provide an even more effective voltage booster circuit, so that scanning by the digitizing tablet can be more accurate.

SUMMARY OF THE INVENTION

Accordingly, it is an object of the invention to provide an improved apparatus and technique for use in conjunction with a digitizing tablet to digitize points along the digitizing surface.

It is another object of the invention to provide an improved cursor structure that reduces operator fatigue and resulting operator errors.

It is another object of the invention to provide a cursor unit for digitizing points along a digitizing surface wherein alignment with the points to be digitized is accomplished more easily than for digitizing pens of the prior art and wherein errors due to tilt are avoided.

It is another object of the invention to provide a cordless four button cursor that utilizes the capacitance of an operator's body, yet avoids data shifting errors due to a change in ground plane capacitance when the cursor unit is released by an operator's hand.

Briefly described, and in accordance with one embodiment thereof, the invention provides a cursor housing and improved operating circuitry therein for avoiding data errors due to changes in ground plane capacitance in a cordless embodiment of the invention that adds operator body capacitance to ground plane capacitance. The described embodiment of the invention includes an insulative housing mounted on a horizontal transparent substrate. The housing includes four buttons, each shaped as a quadrant of a circle, arranged about a stationary hub or post. The stationary hub extends slightly above the surface of adjacent inner portions of the four quadrant buttons, acting as a stationary support upon which an operator's finger can conveniently rest and from which the operator's finger can laterally roll or slide to actuate any of the four quadrant buttons. A conductive circular antenna loop formed as part of a printed circuit board rests in a recess in an upper surface of the transparent substrate and extends forward beyond the housing. The circular antenna loop subtends a cross hair printed on the bottom of the conductive substrate. A smooth felt bottom surface on the transparent substrate allows the cursor unit to be easily slid across the digitizing surface, allowing an operator to easily align the cross hair with a point to be digitized by viewing the cross hair through the circular loop of the printed antenna. Two opposed conductive "touch plate" surfaces are provided on opposed sides of the housing and are electrically short circuited together by the resistance of an operator's hand gripping the four button cursor unit. The short circuiting of the touch plates connects the capacitance of the operator's body in parallel with the capacitance of an internal ground plane relative to which an electrostatic antenna signal is referenced. Short circuiting of the touch plates by the resistance of the operator's body also generates an "enable" signal to an oscillator circuit, so that the oscillator circuit stops immediately when the operator's hand breaks contact with the touch plates. This immediately halts the antenna signal, so that continued scanning by X grid conductors and Y grid conductors embedded in the digitizing tablet surface does not result in an error in digitized data due to the decrease in the capacitance of the ground plane. In the described embodiment of the cordless cursor unit, an improved internal voltage boosting circuit is described to increase the amplitude of the electrostatic signal produced by the loop antenna.

DETAILED DESCRIPTION OF THE INVENTION

Figure 1:
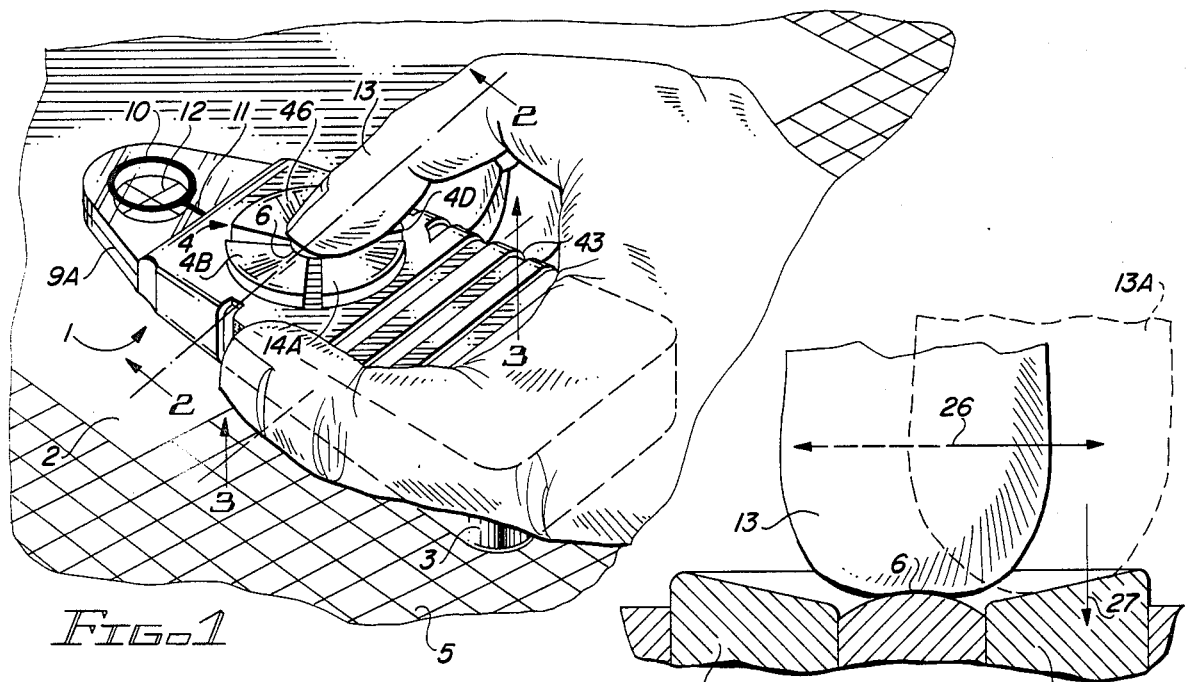
FIG. 1 is a perspective view illustrating the four button cursor of the present invention being operated by the hand of an operator.

Referring to the drawings, particularly to FIG. 1, a four button cursor unit 1 rests on a document 2 to be digitized. Document 2 rests on a digitizing tablet 5, such as the assignee's Model ISl digitizing tablet, which has a grid of embedded conductors in accordance with the disclosure in the above-referenced parent application and in applicant's U.S. Pat. No. 4,492,819 issued Jan. 8, 1985 and U.S. Pat. No. 4,616,106 issued Oct. 7, 1986. Four button cursor 3 includes an insulative plastic housing 3.

Cursor 1 has a four quadrant button keyboard generally designated by numeral 4, including buttons 4A, 4B, 4C, and 4D. Depressing each quadrant button causes cursor unit 1 to produce a corresponding cursor command. (Typical cursor commands might be to draw, "pull down" a menu, digitize, etc.) A center hub or post 6 extends slightly above the surface of the inner edges of the four quadrant buttons 4A-4D, and serves as a rest for a finger 13 of the hand of an operator gripping the sides 7 and 8 (FIGS. 3 and 4) of cursor 1, sliding it over the surface of document 2 to align a cross hair 12 with various points to be digitized on the document 2.

Figure 3:
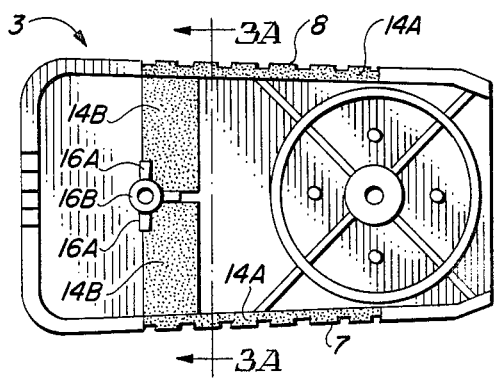
FIG. 3 is a bottom inside view of the upper housing portion of the cursor shown in FIG. 1.
Figure 3A:
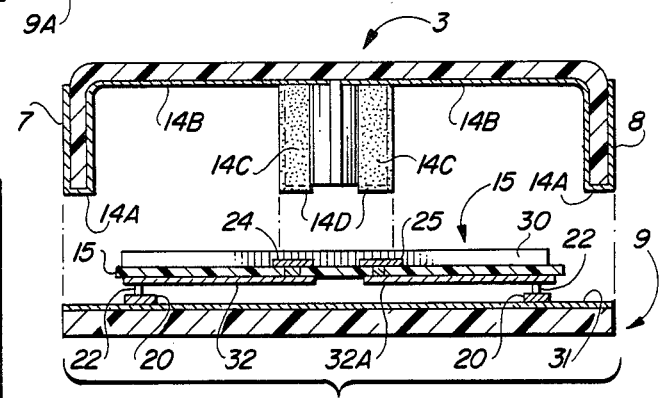
FIG. 3A is an exploded section view taken along section line 3A—3A of FIG. 3.

As best shown in FIGS. 3 and 3A, housing 3 has two conductive side portions 7 and 8, referred to as "touch plates", formed by a conductive paint coating that extends around the lower edges of housing 3, as indicated by 14A, and across the inner upper surface of the housing 3 as indicated by 14B to opposite wings 16A of a vertical post 16B attached to the upper inner surface of housing 3. Each separate section 14B of conductive paint extends continuously along the sides of the wings 16A as indicated by 14C (FIG. 3A), and along the bottom surface of the respective wings, as indicated by 14D.

Housing 3 is attached to a transparent substrate 9 having a thinner main section 9B covered by housing 3 and a slightly thicker forward portion 9A supporting circular antenna loop 10 and cross hair 12. A metalized antenna feed conductor 11 of printed circuit board 15 is connected to circular antenna loop 10. Antenna loop 10 includes a circular loop conductor 10A (FIG. 2C) which is supported by and is coextensive with a portion of printed circuit board 15 that rests in a precisely formed annular recess 18 (FIG. 2C) in the upper surface of portion 9A of the substrate. The metal antenna feed conductor 11 connected to circular antenna loop 10 is disposed on and coextensive with an identically shaped section of printed circuit board 15, and also rests in an identically shaped recess in the upper surface of forward portion 9A of the transparent substrate.

Cross hair 12 is subtended by antenna loop 10 and is etched into the bottom surface 19 of section 9A of the substrate. The center or intersection point of cross hair 12 is precisely vertically aligned with the geometrical center of circular antenna loop 10.

As shown in FIG. 3A, a conductive ground plane conductor 31 is adhesively attached to the upper surface of transparent substrate 9. The printed circuit board assembly 15 is supported above and in spaced relationship to the ground plane conductor 31 by four insulative corner posts 20 that are integral with transparent substrate 9. Plastic insulative alignment keys or posts 22 extend upward from and are integral with the upper surfaces of support posts 20, and extend through clearance holes (not shown) in printed circuit board 15.

The bottom portion 14D of the conductive layer of paint that is electrically continuous with conductive side area 7 abuts and makes electrical connection with a metalized area 24 on the upper surface of printed circuit board 15. Conductive area 24 is connected by a feedthrough to a conductor 32 on the bottom surface of printed circuit board 15. Conductor 32 electrically contacts ground plane conductor 31 by means of a suitable raised portion (not shown) of ground plane conductor 31 or by other suitable means.

Similarly, the bottom portion 14D (FIG. 3A) of the conductive portion 14A,B,C, that is electrically continuous with conductive touch plate area 8 makes electrical contact with a metal area 25 on the upper surface of printed circuit board 15 when the insulative housing 3 is clamped onto the transparent substrate 9. Conductive area 25 is electrically connected by a feedthrough to a conductor 32A on the bottom side of printed circuit board 15, which conductor is connected to the junction between resistors 34 and 36 in FIG. 4, subsequently explained.

FIG. 1 shows how the thumb and one or more fingers of a user's hand grip the opposed conductive side areas 7 and 8 of cursor 1, so that the resistance of the user's hand can short circuit the two conductive areas 7 and 8, thereby (1) causing the capacitance of the user's body to be added in parallel with the internal ground plane capacitance, and (2) enabling an internal oscillator to begin oscillating, as subsequently explained with reference to FIGS. 4 and 4A. The above adding of the user's body capacitance to the capacitance of the ground plane conductor 31 causes the total ground plane capacitance to be much larger than the combined capacitance of the antenna conductors 11 and 12, thereby substantially eliminating radiation of signals by the ground plane conductor 31 to the digitizing tablet during use.

Figure 2:
FIG. 2 is a partial section view taken along section line 2—2 of FIG. 1 illustrating lateral movement of the operator's finger on a hub or rest post of the quadrant button assembly.

FIGS. 1 and 2 also indicate how the user's index finger 13 can conveniently rest upon center post 6, and can be easily moved laterally forward, rearward, right or left of post 6 to actuate the desired one of the push buttons 4C. For example, index finger 13 initially resting on hub or center post 6 can be moved easily to the right or left, as indicated by arrows 26 to depress quadrant button 4B or 4D. Dotted line 13A shows index finger 13 slid to the right in FIG. 2, so that quadrant button 4D is depressed downward in the direction of arrow 27.

Figure 2A:
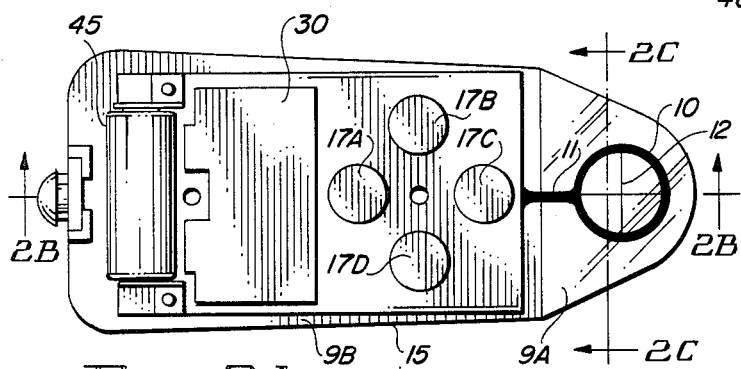
FIG. 2A is a top view of the transparent substrate of the cursor and a printed circuit board thereon.
Figure 2C:
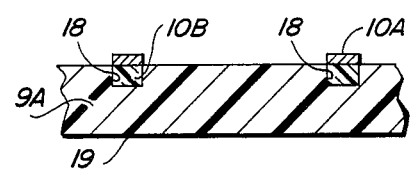
FIG. 2C is a partial section view taken along section line 2C—2C of FIG. 2A.
Figure 4:
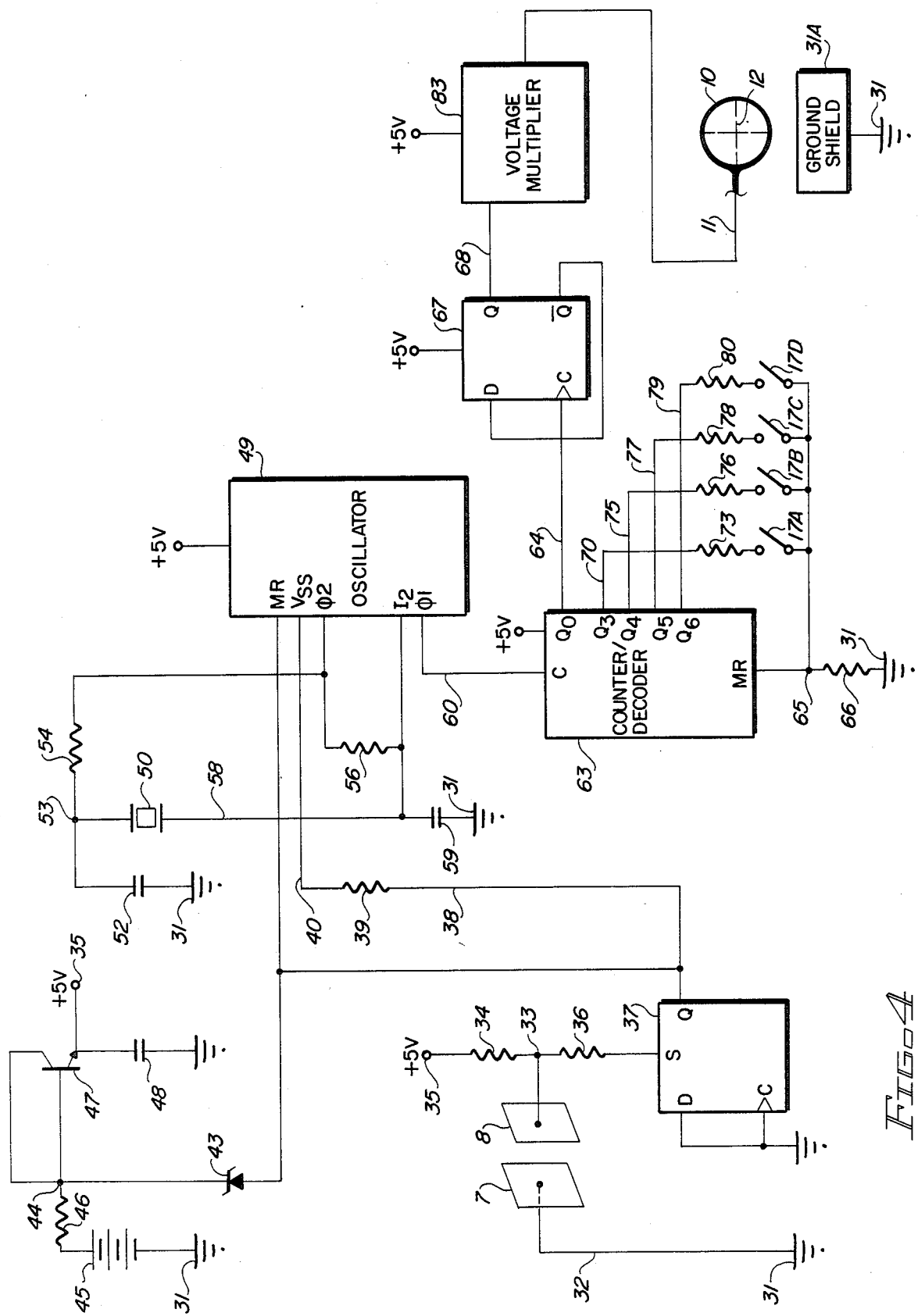
FIG. 4 is a schematic circuit diagram of the circuitry of the four button cursor of FIG. 1.

FIG. 2A is a top view of the printed circuit board and transparent substrate, wherein the circuitry 30 of FIG. 4 is included on the printed circuit board 15. A plurality of conventional dome switches 17A, 17B, 17C and 17D are centered under perpendicular posts (not shown) on the underside of each of quadrant buttons 4A, 4B, 4C, and 4D, respectively, so that when one of those quadrant buttons is depressed by the operator's finger 13, a corresponding one of the dome switches 17A–17D is depressed.

Figure 2B:
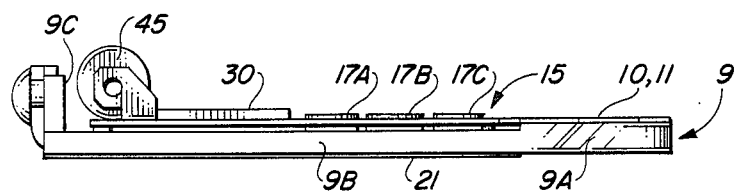
FIG. 2B is a section view taken along section line 2B—2B of FIG. 2A.

As shown in FIG. 2B, printed circuit board 15 is supported so that is upper surface is coplanar with the raised upper surface of section 9A of transparent substrate 9, on the support posts 20 that extend upward from the lowered upper surface of section 9B of transparent substrate 9.

A stack of five 1.5 volt battery cells 45 is provided to supply power for the circuitry 30. Other embodiments of the cursor do not include the batteries, and instead are connected by a supply cord to a power source.

Referring next to FIG. 4, a schematic diagram of the internal cursor circuitry 30 on printed circuit board 15 is shown. Conductive touch plate 7 is connected by conductor 32 to ground plane conductor 31. The other touch plate conductor 8 is connected by conductor 33 to one terminal of each of resistors 34 and 36. The other terminal of resistor 34 is connected to a +5 volt conductor 35. The other terminal of resistor 36 is connected to the set input of a D type CMOS flip-flop 37 having its D input and its clock input both connected to ground conductor 31. The Q output of flip-flop 37 is connected by conductor 38 to one terminal of a resistor 39 and to the anode of a 5.7 volt zener diode 43. The other terminal of resistor 39 is connected by conductor 40 to the $V_{SS}$ input of an oscillator 49, which can be a 45218 CMOS integrated circuit oscillator manufactured by Motorola.

The cathode of zener diode 43 is connected by conductor 44 to one terminal of resistor 46, and to the collector and base of an NPN voltage regulating transistor 47. The other terminal of resistor 46 is connected to the positive terminal of battery 45 shown in FIG. 2B. The negative terminal of battery 45 is connected to ground conductor 31. The emitter of transistor 47 is connected to the conductor 35 to provide a precisely regulated 5 volt supply voltage to all of the other circuitry of FIG. 4. A capacitor 48 connected between conductor 35 and ground conductor 31 functions as a ripple filter.

Conductor 38 from the Q output of flip-flop 37 also is connected to the master reset (MR) input of oscillator 49. A 850 kHz crystal 50 has a terminal connected by conductor 53 to a terminal of capacitor 52 and to a terminal of resistor 54. The other terminal of capacitor 52 is connected to ground conductor 31. The other terminal of resistor 54 is connected by conductor 55 to the $\phi_2$ input of oscillator circuit 49. The other terminal of crystal 50 is connected by conductor 58 to a terminal of capacitor 59 and to the $I_2$ input of oscillator 49. The other terminal of capacitor 59 is connected to ground conductor 31. Resistor 56 is connected between conductors 55 and 58.

The $\phi_1$ terminal of oscillator 49 is connected by conductor 60 to the clock input of a programmable counter/decoder circuit 63, which can be a 4017B counter/decoder CMOS integrated circuit manufactured by RCA. It has ten outputs $Q_0$ through $Q_9$. The $Q_0$ output is connected by conductor 64 to the clock input of a D type CMOS flip-flop 67. The output $Q_3$ is connected by conductor 70 and resistor 73 to one terminal of dome switch 17A. $Q_4$ is connected by conductor 75 and resistor 76 to one terminal of dome switch 17B. $Q_5$ is connected by conductor 77 and resistor 78 to one terminal of dome switch 17C. Finally, $Q_6$ is connected by conductor 79 and resistor 80 to one terminal of dome switch 17D. The other terminal of each of dome switches 17A–17D is connected by conductor 65 to the master reset (MR) input of counter/decoder 63 and to one terminal of resistor 66, the other terminal of which is connected to ground conductor 31.

If switch 17A is closed, counter/decoder circuit 63 functions as a divide-by-four counter dividing the signal on conductor 60 by four and applying it via conductor 64 to the clock input of D type flip-flop 67. If dome switch 17B is closed, counter/decoder circuit 63 divides the signal on conductor 60 by five. Similarly, switches 17C and 17D cause counter/decoder circuit 63 to function as a divide-by-six or a divide-by-seven circuit, respectively. As explained in detail in the data sheet of the 40178 counter/decoder circuit, the counter/decoder 63 counts to ten and repeats, producing separate pulses on each of the Q0, Q1, Q2, etc. outputs, respectively, 1, 2, 3, etc. clock times after it has been reset. Producing a "1" on the master reset (MR) input via conductor 65 by closing one of the dome switches 17A–17D thus produces narrow pulses on conductor 64, each having the width of the clock signal on conductor 60 and a frequency determined by which, if any, of the switches 17A–17D is closed. D type flip-flop 67 divides the signal on conductor 64 by two, producing a square wave, which then is applied to an input of voltage multiplier circuit 83. The output of voltage multiplier 83 is transmitted by conductor 11 to circular antenna conductor 10.

When touch plates 7 and 8 are not shorted together by resistance of the user's hand, the voltage on conductor 38 is at a "1" level, because the high voltage on 5 volt supply conductor 35 and resistors 34 and 36 cooperate to produce a "1" on the set input of flip-flop 37. The "1" level on conductor 38 is high enough that zener diode 43 is off, and the voltage on conductor 44 is the stand-by voltage of battery 45, since very little current is being drained therefrom by circuits 37, 49, 63, 67, and 83, all of which are CMOS integrated circuits. The voltage on supply voltage conductor 35 then is unregulated, and is equal to the voltage on conductor 44 minus the base-to-emitter voltage of transistor 47. The $V_{SS}$ supply voltage terminal of oscillator 49 is also at the same "1" level, so that oscillator 49 does not operate.

When the user's hand touches both conductive touch plates 7 and 8, the voltage on conductor 33 is pulled from a "1" level to a ground level, setting a "0" into flip-flop 37, causing the voltage on conductor 38 to fall to ground. This reverse biases zener diode 43, producing a regulated voltage of about 6.7 volts on conductor on 44, thereby producing a regulated +5 volt level on conductor 35. The logical "1" on conductor 38 also causes $V_{SS}$ of oscillator 49 to be at ground, enabling oscillator 49 to oscillate at the frequency established by crystal 50.

A square wave signal feel having a frequency of 850 kHz thereby is produced on conductor 60, which clocks counter/decoder circuit 63. Counter/decoder circuit 63 produces a narrow repetitive pulse signal on conductor 64, each pulse having the width of one of the pulses on clock conductor 60, at a frequency of 425,000 hertz if none of switches 17A–D are closed, 212,500 hertz if only switch 17A is closed, 170,000 hertz if only switch 17B is closed, 141,666 hertz if only switch 17C is closed, or 121,428 hertz if only switch 17D is closed. The selected frequency on conductor 64 is divided by two by flip-flop 67, which then produces a square wave signal on conductor 68 having half the frequency of the pulse signal on conductor 64. The signal on conductor 68 is applied to the input of voltage multiplier circuit 83, which produces an amplified electrostatic signal on antenna loop 10. The amplified electrostatic signal is transmitted to and scanned by the X and Y grid conductors embedded in digitizing tablet 2.

Figure 4A:
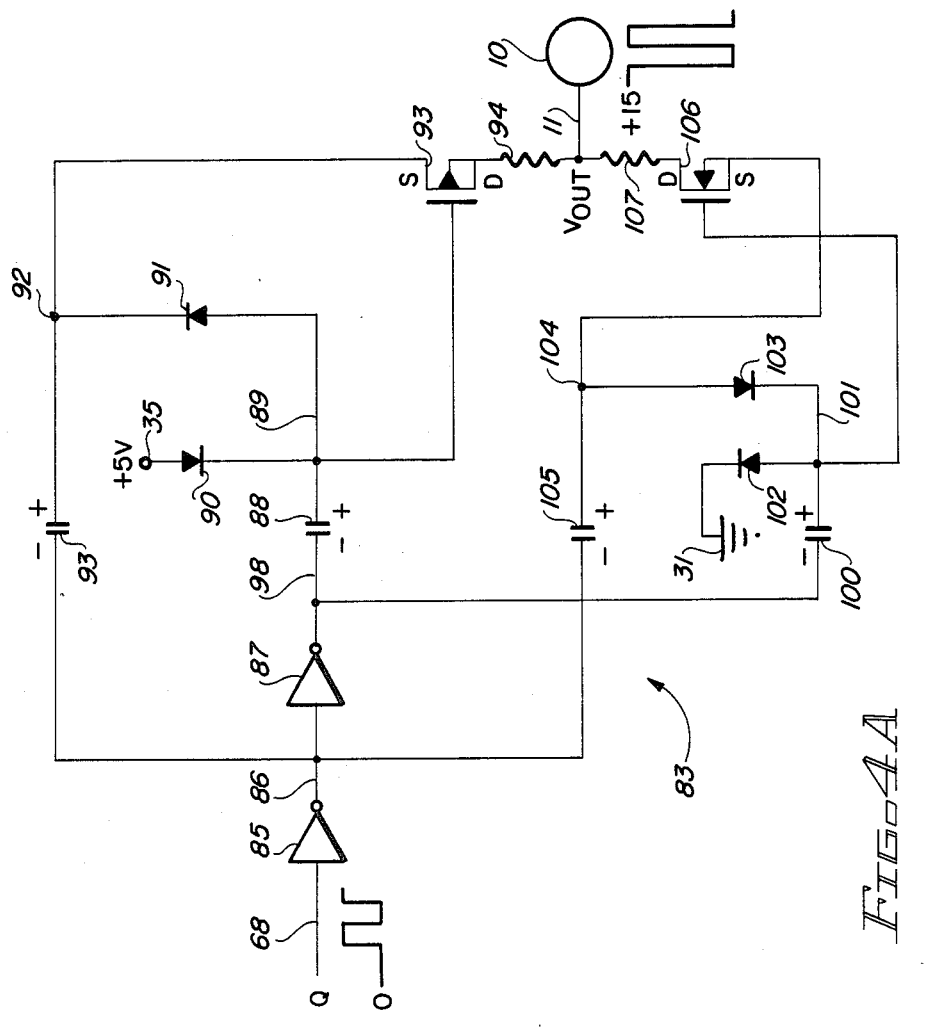
FIG. 4A is a schematic circuit diagram of the voltage multiplier circuit which drives the antenna loop of the cursor of FIG. 1.

Referring next to FIG. 4A, voltage multiplier circuit 83 has its input connected by conductor 68 to the Q output of D type CMOS flip-flop 67. Conductor 68 is connected to the input of a CMOS inverter 85 having its output connected by conductor 86 to the input of a second CMOS inverter 87. Conductor 86 is connected to one terminal of each of capacitors 93 and 105. The output of inverter 87 is connected by conductor 98 to a first terminal of each of capacitors 88 and 100. The second terminal of capacitor 88 is connected by conductor 89 to the cathode of a diode 90 and to the anode of another diode 91, and to the gate electrode of a P channel MOS field effect transistor (MOSFET) 93. The source of MOSFET 93 is connected by conductor 92 to the cathode of diode 91 and to the second terminal of capacitor 93. The anode of diode 90 is connected to +5 volt conductor 35. The drain electrode of MOSFET 93 is connected by resistor 94 to conductor 11, by means of which the output volta $V_{OUT}$ is applied to antenna loop 10.

The second terminal of capacitor 100 is connected by conductor 101 to the anode of diode 102, the cathode of which is connected to ground conductor 31. Conductor 101 also is connected to the cathode of diode 103 and to the gate electrode of N channel MOSFET 106. The source electrode of N channel MOSFET 106 is connected by conductor 104 to the anode of diode 103 and to the second terminal of capacitor 105. The drain electrode of N channel MOSFET 106 is connected by resistor 107 to $V_{OUT}$ conductor 11.

Figure 5:
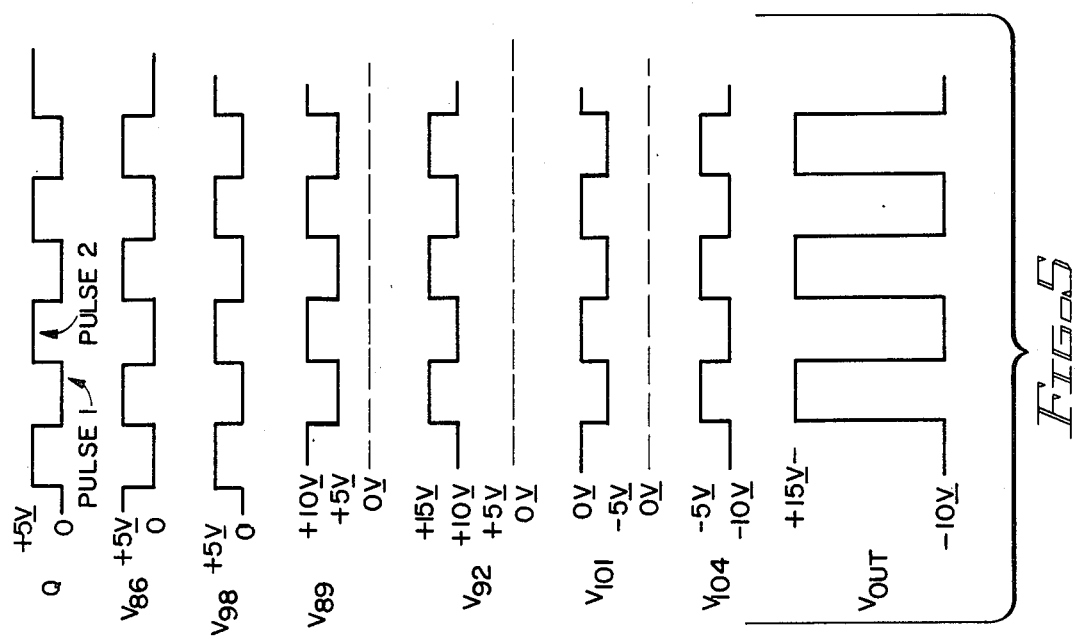
FIG. 5 is a set of waveforms useful in explaining the operation of the voltage multiplier circuit of FIG. 4.

The operation of the voltage multiplier circuit of FIG. 4A can be best understood with reference to the waveforms in FIG. 5. The Q output of divide-by-two flip-flop 67 is shown. The output of inverter 85 is the voltage $V_{86}$ waveform, which is connected to one terminal of each of capacitors 93 and 105. The output of inverter 87 is the voltage $V_{98}$, which is connected to one terminal of each of capacitors 88 and 100. For the purpose of explaining the operation of the voltage multiplier circuit 83, it is assumed that diodes 90, 91, 102, and 103 are "perfect" diodes that have no forward voltage drop. Then, diode 90 prevents the voltage on conductor 89 from falling below +5 volts. When $V_{98}$ is at 0 volts, capacitor 88 is charged to +5 volts. As $V_{98}$ undergoes transitions from 0 volts to +5 volts and back to 0 volts, the waveform $V_{89}$ undergoes corresponding transitions from +5 volts to +10 volts and from +10 volts, back to +5 volts, respectively. Diode 90 keeps capacitor 88 charged up to +5 volts.

When $V_{89}$ rises to +10 volts, diode 91 prevents $V_{92}$ from falling below +10 volts, and since at the same time $V_{86}$ is at 0 volts, diode 91 ensures that capacitor 93 is charged to +10 volts. Then, when $V_{86}$ undergoes a transition from 0 volts to +5 volts, $V_{92}$ is boosted from +10 volts to +15 volts, as shown by waveform $V_{92}$ in FIG. 5.

Similarly, diode 102 prevents $V_{101}$ from going more positive than 0 volts, so when $V_{98}$ volts is equal to +5 volts, capacitor 100 is charged to −5 volts. When $V_{98}$ goes from +5 volts to 0 volts, capacitor 100 boosts $V_{101}$ to −5 volts. As $V_{98}$ continues to undergo transitions from +5 volts to 0 volts and from 0 volts back to +5 volts continue, $V_{101}$ undergoes transitions from 0 volts to −5 volts, and from −5 volts back to 0 volts, respectively.

When $V_{101}$ falls −5 volts, diode 103 prevents $V_{104}$ from being more positive than −5 volts, and since $V_{86}$ is at 0 volts at the same time, diode 103 causes capacitor 105 to be charged to −5 volts. Then, when $V_{86}$ undergoes a transition from +5 volts to 0 volts, capacitor 105 boosts $V_{104}$ from −5 volts to −10 volts, producing the $V_{104}$ waveform shown in FIG. 5.

It can be seen that during PULSE 1 of the Q waveform in FIG. 5, $V_{89}$ is +5 volts and $V_{92}$ is +15 volts. This causes the P channel MOSFET 93 to be on. At the same time, $V_{101}$ is −5 volts and $V_{104}$ is −5 volts. This causes N channel MOSFET 106 to be off. Consequently, VOUT on conductor 11 is charged to the voltage of $V_{92}$ i.e., to +15 volts. During the next pulse, i.e., PULSE 2, $V_{89}$ is +10 volts and $V_{92}$ is +10 volts, so P channel MOSFET 93 is off. At the same time, $V_{101}$ is 0 volts and $V_{104}$ is −10 volts, so N channel MOSFET 106 is On. Consequently, VOUT is charged through N channel MOSFET 106 to the voltage of $V_{104}$, i.e , to −10 volts.

The resulting waveform for $V_{OUT}$ is shown in Fig. 5, and undergoes transitions from −10 volts to +15 volts. Note that the actual $V_{OUT}$ waveform does not quite attain either the +15 volt or −10 volt limit derived by the above analysis because the diodes have forward voltage drops of about 0.7 volts and because there are some reductions in the positive and negative peak voltage amplitude due to capacitive voltage division. Nevertheless, the actual $V_{OUT}$ waveform achieves positive peaks of about +13 volts and negative peaks of about −9 volts. This produces a substantially increased antenna signal level on antenna 10 over that described in the voltage multiplier circuit described in the above-identified parent application, improving the performance of the cursor.

While the invention has been described with respect to a number of embodiments, those skilled in the art will be able to make various modifications to the described embodiment without departing from the true spirit and scope of the invention. It is intended that all structures and techniques which are equivalent to those described herein in that they perform substantially the same function in substantially the same way to achieve the same result are within the scope of the invention. For example, flip-flop 37 could be switched by a mechanical pressure-sensitive switch that is actuated when a slight downward pressure is applied to a suitable portion of the cursor unit 1 so that a "1" appears on conductor 40 whenever the user lifts his or her hand from the cursor unit, leaving it lying on the digitizing surface. Such a switch could be located on the bottom surface of the cursor, or even beneath the center post 46.

What is claimed is:

1. A cursor for use in digitizing points along a digitizing surface of a digitizer, the cursor comprising in combination:
   (a) bottom surface means for sliding the cursor smoothly along the digitizing surface;
   (b) housing means attached to the bottom surface means and grippable by a hand of an operator for enabling the operator to hold and operate the cursor;
   (c) alignment indicia means attached in fixed relationship to the housing means for enabling the operator to visually align the cursor with the points to be digitized;
   (d) non-directional antenna means attached in fixed relationship to the alignment indicia means for transmitting an antenna signal to the digitizing surface substantially independently of the rotational orientation of the cursor about an axis perpendicular to the plane of the digitizing surface when the bottom surface means rests on the digitizing surface; and
   (e) means for producing the antenna signal on the antenna means in response to pressure applied to the cursor by the hand of the operator, wherein the antenna signal producing means include
      i. circuit means for producing a plurality of different frequency signals,
      ii. means responsive to the signals produced by the circuit means for producing the antenna signal,
      iii. a plurality of switch buttons arranged around a post,
      iv. a plurality of control switches corresponding to the switch buttons, respectively, connected to the circuit means for causing the circuit means for produce a signal having a frequency determined by the states of the control switches.

2. The cursor of claim 1 wherein the alignment indicia means includes a cross hair mark having a center point and the antenna means includes a circular antenna conductor that subtends the cross hair mark, the center of the circular antenna conductor being aligned with the center point of the cross hair mark.

3. The cursor of claim 2 wherein the switch buttons have top surfaces approximately aligned with the top of the post to allow the operator to rest a finger on the post and move the finger laterally to actuate the control switches.

4. The cursor of claim 2 wherein the circular antenna and cross hair mark extend beyond the housing means, whereby the operator can conveniently visually align the center point of the cross hair mark with a point to be digitized.

5. The cursor of claim 4 wherein the bottom surface means including a transparent substrate, the cross hair mark being disposed on a bottom surface of the transparent substrate, the circular antenna conductor being supported by an upper surface of the transparent substrate.

6. The cursor of claim 5 wherein the circular antenna conductor is disposed on and is coextensive with a circular section of a printed circuit board supported in a groove in the upper surface of the transparent substrate, another portion of the printed circuit board containing the circuit means and being disposed inside the housing means.

7. A cursor for use in digitizing points along a digitizing surface of a digitizer, the cursor comprising in combination:
   (a) bottom surface means for sliding the cursor smoothly along the digitizing surface;
   (b) housing means attached to the bottom surface means and grippable by a hand of an operator for enabling the operator to hold and operate the cursor;
   (c) alignment indicia means attached in fixed relationship to the housing means for enabling the operator to visually align the cursor with the points to be digitized;
   (d) non-directional antenna means attached in fixed relationship to the alignment indicia means for transmitting an antenna signal to the digitizing surface substantially independently of the rotational orientation of the cursor about an axis perpendicular to the plane of the digitizing surface when the bottom surface means rests on the digitizing surface;
   (e) means for producing the antenna signal on the antenna means in response to pressure applied to the cursor by the hand of the operator;
   (f) a ground plane conductor, the antenna signal producing means being electrically grounded to the ground plane conductor; and
   (g) conductive touch plate means disposed on an external surface of the housing means and electrically connected to the ground plane conductor for adding capacitance of the operator's body to the capacitance of the ground plane conductor, to substantially avoid transmission of error producing signals to the digitizing surface by the ground plane conductor.

8. The cursor of claim 7 wherein the antenna signal producing means includes an oscillator producing an oscillator signal and circuit means responsive to the oscillator signal for generating the antenna signal, the cursor including enabling means for enabling the oscillator to produce the oscillator signal while the operator's hand maintains pressure on the touch plate means and disabling the oscillator from producing the oscillator signal when the pressure is released, whereby digitizing errors due to reduction in ground plane capacitance cauase by breaking electrical contact between the operator's hand and the conductive touch plate means are avoided.

9. The cursor of claim 8 wherein the housing means is composed of electrically insulative material, and the conductive touch plate means includes a first conductive area on a first side of the housing means electrically connected to the ground plane conductor, and a second conductive area spaced from the first conductive area and connected to the enabling means, the enabling means enabling the oscillator to produce the oscillator signal in response to a ground voltage produced on the second conductive area when it is electrically connected to the first conductive area by resistance of the operator's hand and disabling the oscillator in response to a signal produced on the second conductive area when resistance of the user's hand stops connecting the second conductive area to the first conductive area.

10. The cursor of claim 9 wherein the first and second conductive areas are composed of conductive paint and are disposed on approximate sides of the housing means, and are connected to first and second metal conductors that are connected to the ground plane conductor and the enabling means, respectively.

11. The cursor of claim 10 including zener diode means for regulating a supply voltage of a supply voltage conductor connected to the circuit means when the resistance of the operator's hand eletrically connects the firstt conductive area to the second conductive area, and means for deregulating the supply voltage to reduce power dissipated in zener diode means when the second conductive area is electrically disconnected from the first conductive area.

12. A voltage multiplier circuit, comprising in combination:
   (a) first means for conducting a first respective signal;
   (b) second means for conducting a second respective signal which is 180 degrees out of phase with the first respective signal;
   (c) first and second capacitors each having a first terminal coupled to the first means, and third and fourth capacitors each having a first terminal coupled to the second means;
   (d) first, second, third and fourth diodes;
   (e) a P channel field effect transistor and an N channel field effect transistor;
   (f) third means for coupling the second terminal of the first capacitor, the cathode of the first diode, the anode of the second diode, and the gate electrode of the P channel field effect transistor together;
   (g) first means for coupling the source electrode of the P channel field effect transistor, the second terminal of the capacitor, and the cathode of the second diode together;
   (h) fifth means for coupling the second terminal of the second capacitor, the anode of the third diode, the cathode of the fourth diode, and the gate electrode of the N channel field effect transistor together;
   (i) sixth means for coupling the second terminal of the fourth capacitor, the anode of the fourth diode, and the source electrode of the N channel field effect transistor together;
   (j) means for coupling the anode of the first diode to a first supply voltage conductor and means for coupling the cathode of the third diode to a second supply voltage conductor; and
   (k) means for coupling the drain electrode of the P channel field effect transistor and the N channel field effect transistor to an output conductor.

13. The voltage multiplier circuit of claim 12 wherein the P channel field effect transistor and the N channel field effect transistor are MOS field effect transistors.

14. The voltage multiplier circuit of claim 13 wherein the third, fourth, fifth, and sixth means each comprise a separate conductor.

15. The voltage multiplier circuit of claim 14 wherein the drain electrode coupling means includes a first resistor coupled between the drain electrode of the P channel field effect transistor and the output conductor and a second resistor coupled between the drain electrode of the N channel field effect transistor and the output conductor.

16. The voltage multiplier circuit of claim 15 including means for producing the second repetitive signal as a square wave signal, and means responsive to the second repetitive signal for producing the first square wave as a square wave signal.

17. A method of digitizing points along a digitizing surface, comprising the steps of:
   (a) placing a sheet having points to be digitized on the digitizing surface;
   (b) placing a cursor unit having a housing grippable by a hand of an operator onto the sheet;
   (c) gripping the housing by means of the operator's hand, and (1) automatically connecting the capacitance of the operator's body in parallel with the capacitance of an internal ground plane conductor to provide an increased total effective ground plane capacitance, and (2) automatically enabling a first circuit to produce a first repetitive signal in response to pressure applied by the hand to the housing;
   (d) coupling the first repetitive signal to an antenna attached to the housing and positioned to transmit an antenna signal to grid conductors embedded in the digitizing surface;
   (e) providing an alignment indicia attached to the housing in fixed relationship to the antenna;
   (f) sliding the cursor unit along the digitizing surface to align the alignment indicia with a first point to be digitized; and
   (g) actuating a first switch to cause the first circuit to generate a first cursor command signal on the antenna to indicate that the coordinates of the first point are to be digitized.

18. The method of claim 17 including providing a first conductive area on a first side of the housing and a second conductive area on a second side of the housing, and electrically short circuiting the first conductive area to the second conductive area through the resistance of the operator's hand, as the operator touches the first and second area to grip the housing.

19. The method of claim 18 including electrically connecting the first conductive area to the ground plane conductor and electrically connecting the second conductive area to an input of a second circuit that enables the first circuit to produce the first repetitive signal when the second conductive area is electrically short circuited to the first conductive area.

20. The method of claim 19 including causing the second circuit to immediately disable the first circuit and thereby immediately halt the first repetitive signal when the operator's hand breaks contact with the first or second conductive area, whereby transmission of error-causing signals by the plane conductor to the digitizing surface due to a reduction of the effective capacitance of the ground plane conductor is avoided.

21. The method of claim 20 including digitally scanning the grid conductor to sense signals produced therein in response to the transmitted antenna signals, to thereby produce first and second digital grid location numbers representative of the X and Y coordinates of the first point, respectively.

22. The method of claim 21 including providing four quadrant switch means on the housing surrounding a finger resting post, resting a finger of the operator on the post, and laterally sliding the finger from the post to actuate a selected quadrant switch means to thereby actuate the first switch.

23. The method of claim 22 including selecting the first and second digital grid location numbers to produce the digitized location of the first point in response to the first cursor command.

24. The method of claim 20 including supporting the alignment indicia on a bottom surface of a transparent plate extending forward from the housing, the alignment indicia having a center point, step (f) including the aligning the center point with the first point.

25. The method of claim 24 wherein the antenna includes a circular loop having a center associated therewith, the method including supporting the circular loop above the transparent plate and the alignment indicia so that the center of the circular loop is vertically aligned with the center point of the alignment indicia, step (f) including viewing the alignment indicia through the circular loop and the transparent plate.

* * * * *